Aug. 30, 1938.  A. STENWALL  2,128,437
APPARATUS FOR AND METHOD OF PRODUCING SPLIT WIRE RINGS
Filed March 25, 1935
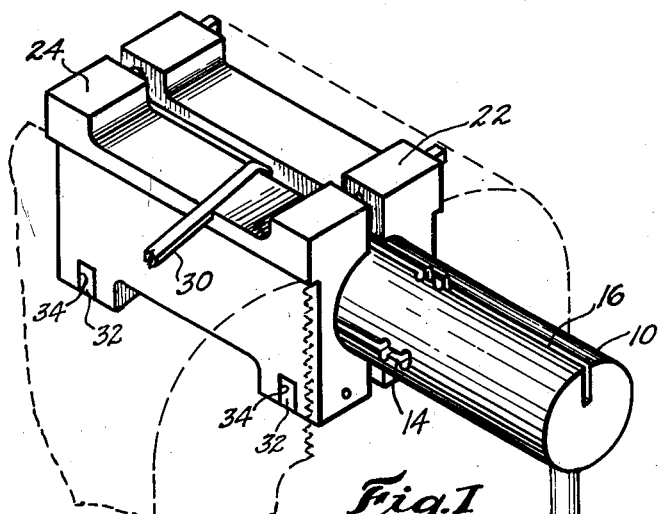
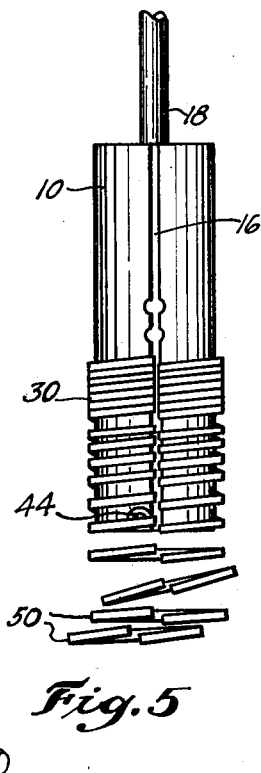
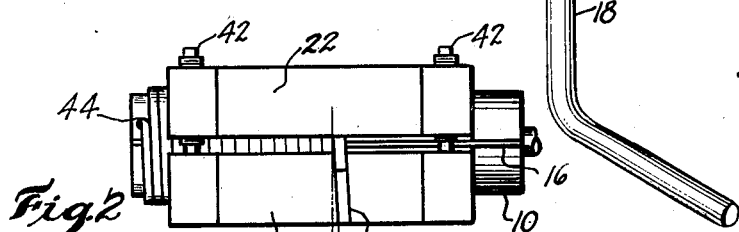
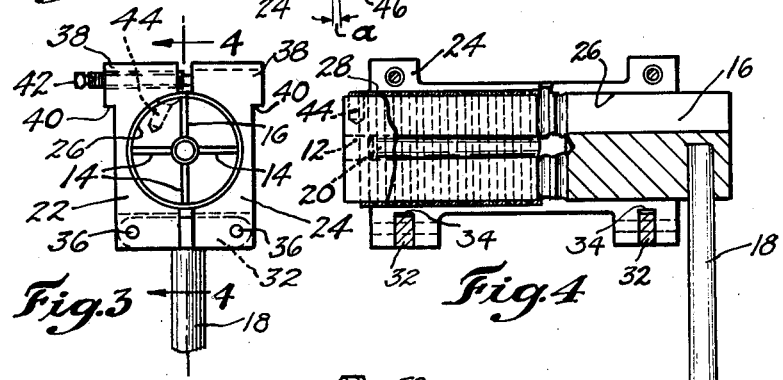
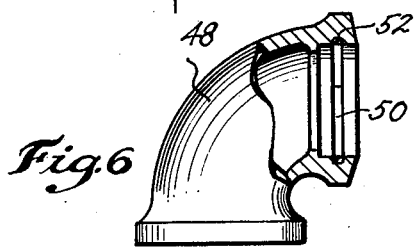
INVENTOR.
Alfred Stenwall
BY Albert J. Henderson
HIS ATTORNEY.

Patented Aug. 30, 1938

2,128,437

UNITED STATES PATENT OFFICE 2,128,437

APPARATUS FOR AND METHOD OF PRODUCING SPLIT WIRE RINGS

Alfred Stenwall, Kewanee, Ill., assignor to Walworth Patents Inc., Boston, Mass., a corporation of Massachusetts Application March 25, 1935, Serial No. 12,826

10 Claims. (Cl. 153—67)

This invention relates to apparatus for and method of producing split wire rings. The invention is particularly applicable, though not so limited, for producing those rings of fusible material which are inserted in suitably grooved pipe fittings and the like during manufacture.

Such fittings are adapted to receive a length of pipe or rod which is inserted in the bore thereof. When heat is applied the fusible metal is melted and caused to flow from the groove between the exterior of the pipe and wall of the bore of the fitting. Hence, it is important that the diameter of the bore of the fitting be made but slightly oversize with respect to the external diameter of the pipe, so that capillary action may aid the movement of the fusible material from the groove. Consequently, in forming the rings of fusible material, it is essential that no appreciable variations occur in the size of the inner or outer diameter or otherwise trouble will be encountered in forming the joint.

It is a primary object of this invention to facilitate the production of split rings of uniform size.

Another object of the invention is to facilitate the production of the rings in substantial quantities.

Another object of the invention is to permit acceptable rings to be formed economically, as by the use of unskilled labor.

Another object of the invention is to utilize substantially all of the raw material without waste.

Another object of the invention is to utilize a simple ring forming apparatus and thus reduce expenditure for construction and upkeep thereof.

Other objects and advantages will become apparent from the following description taken in connection with the accompanying drawing wherein:

Fig. 1 is a perspective view of the ring forming apparatus.

Fig. 2 is a plan view of the same.

Fig. 3 is an end elevation of the apparatus.

Fig. 4 is a longitudinal sectional view taken on the line 4—4 of Fig. 3 looking in the direction indicated by the arrows.

Fig. 5 is a front elevation of one part of the apparatus detached from the other and showing the rings in final form and Fig. 6 is a front elevation partly in section of a pipe fitting showing one of the rings in position.

Referring more particularly to the drawing, the apparatus illustrated therein is formed of two separable parts, one of which comprises a cylindrical mandrel 10 having a tapered axial perforation 12 at one end and terminating at a point intermediate the ends thereof. The perforated end of the mandrel is split in two places, the splits including three equally spaced slots 14 extending radially to the outer periphery of the mandrel and longitudinally to the inner end of the perforation 12. Opposite one of the three slots 14 thus formed is a fourth slot 16 which similarly extends radially to the outer periphery of the mandrel 10 but is continued longitudinally throughout the length of the mandrel for a purpose which will be described hereinafter. At the opposite end of the mandrel 10 from the tapered perforation 12 and located diametrically opposite the slot 16 is a crank 18, by means of which the mandrel can be rotated. Cooperating with the tapered perforation 12 is a tapered pin 20 which when driven into the perforation will serve to expand the split end of the mandrel 10, as will be apparent. It will be understood by those skilled in the art that the tapered pin 20 may be provided with threads to cooperate with threads formed in the perforation 12 and in such case the pin would be threaded rather than driven into position.

The other separable part of the apparatus comprises a pair of clamps 22 and 24 having complemental semi-circular recesses which together form an axial opening 26 within which the mandrel may be journaled. Thus, when in position the clamps serve to substantially enclose the mandrel 10. The axial opening 26 is enlarged at one end as at 28 by a deepening of the recesses from a point midway between the ends of the clamps. This enlargement 28 is adapted to cooperate with the mandrel when positioned in the clamps to form an annular space in which the wire 30 from which the rings are formed may be received.

In order to secure the clamps 22 and 24 together while permitting separation thereof for removal of the mandrel 10, a pair of hinge-plates 32 is provided which extend from one edge of one clamp to the opposite edge of the other. These hinge plates may be inserted in suitable slots 34 formed in the lower edge of the clamps 22 and 24 and each plate 32 may be provided with a pair of pins 36 extending therethrough and upon which the clamps 22 and 24 will pivot. The apparatus is intended to be supported in a vise or similar holding device, as shown in Fig. 1 and for this purpose, each clamp is provided with an enlarged head 38, defining a shoulder 40 upon which the clamps may rest when so supported. The clamp designated 24 is further provided with a pair of adjustment screws 42 which extend through the enlarged head 38 thereon and abut the inner face of the opposite clamp 22, as shown in Fig. 3. As shown, the inner faces of the clamps are spaced one from the other and a portion of the mandrel is thus exposed.

From the structure so far described, it will be apparent that the mandrel 10 may be positioned in the clamps 22 and 24 and the latter adjusted to permit free rotation of the mandrel in the bore 26. In its initial position, that is, before the wire is inserted, the split end of the mandrel projects slightly into the enlarged portion 28 and in this position is ready to receive the wire 30. In order to anchor the free end of the wire 30 to the mandrel a perforation 44 is provided in the split end thereof extending inwardly from the periphery adjacent the slot 16. Preferably, this perforation extends at an angle to the vertical plane of the slot 16 in order that the wire 30 may be more readily inserted.

As it is desired to form a helical coil of the wire 30 some means must be provided for guiding the wire on to the rotating mandrel to cause the mandrel to travel longitudinally with respect to the clamps as it rotates therein. In this instance, this purpose is achieved by providing a slot 46 in the upper face of the clamp 24 which slot is cut at an oblique angle to the longitudinal axis of bore 26 and therefore of the mandrel 10. As shown in Fig. 2 the slot 46 deviates approximately four degrees from the perpendicular, as shown at "a" and this amount has been found to be a convenient one for the purpose described. It will be apparent that other means of guiding the wire 30 could be employed, such as guide pins or the like, and such means are included within the scope of this invention.

In the operation of the device the mandrel 10 is positioned in the clamps 22 and 24 and the assembled apparatus placed in a vise. The screws 42 are then operated to adjust the clamps in spaced relation so that the mandrel 10 can be rotated freely by the crank 18. The mandrel is moved longitudinally until the anchoring hole 44 lies opposite the slot 46 in the clamp 24. The fusible wire 30 is inserted in the slot 46 and the end thereof pushed into the hole 44. The crank is then manually operated to move the mandrel in a clockwise direction, thus causing the fusible wire to form a helical coil around the mandrel 10 within the confines of the annular space.

The final position of the apparatus is with the split end of the mandrel projecting beyond the end of the clamps as shown in Fig. 4. The crank 18 is then positioned to point in a downward direction whereupon the slot 16 will occupy the uppermost position, as shown in Fig. 4. The extension of this slot 16 to the end of the mandrel 10 affords visual indication of the position thereof so that the part of the coil exposed between the clamps 22 and 24 and overlying the slot 16 may be cut completely through by the use of a chisel or other suitable tool, thus separating the individual turns of the coil into split rings 50, as shown in Fig. 5. The apparatus may then be removed from the vise and the clamps 22 and 24 swung apart on their pivots, whereupon the mandrel 10 may be removed from the clamps and the rings removed from the mandrel.

It will be observed from Fig. 5 that the split ends of the rings 50 thus formed are not exactly opposite each other, but this is not a disadvantage when making use of the rings, such as by inserting them in groove 52 of the pipe fitting 48, shown in Fig. 6. It has been found that a split end of the ring may be inserted into the groove and the ring rotated in the groove until finally positioned in much the same manner as a screw is threaded into a tapped hole. If the rings were flat such threading action could not be imparted thereto and some difficulty would be experienced in inserting the rings into the groove.

It will further be observed that there need be little or no waste in utilizing the apparatus described. In the usual course of manufacture this fusible wire is supplied in coils of forty feet or more and the ring forming operation can be carried out with a percentage of waste that is negligible.

A very important feature of the device is that both the outer and inner peripheries of the helix are shaped at the same time as the coil is being formed and the coil is held to desired size within close limits. Should the wire supplied vary in thickness, or oversized rings be required, the mandrel and the clamps can be adjusted to compensate for variations of this kind. It will be understood that the invention is not limited to use with fusible wire, but that wires of other characteristics may be used with equal facility.

The apparatus described is of the simplest type and is economical to manufacture and use. The method of producing split rings is also simple and rings of uniform size and quality can be produced without requiring skill on the part of the operator.

Thus, all the objects of the invention have been accomplished in a simple and economical manner.

I claim:

1. Apparatus of the class described, comprising a traveling mandrel adapted to grasp a wire, means to support said mandrel, means to rotate said mandrel in said support, and means on said support to guide the wire on to the rotating mandrel at an oblique angle to the longitudinal axis thereof to form a helical coil, and means on said support to confine the coil in close engagement with the mandrel.

2. Apparatus of the class described, comprising a traveling mandrel adapted to grasp a wire, means to support said mandrel, means to rotate said mandrel in said support, and means on said support to guide the wire on to the rotating mandrel at an oblique angle to the longitudinal axis thereof to form a helical coil, and means on said support to confine the coil in close engagement with the mandrel, said support being adapted to expose a longitudinal strip of said coil to permit splitting thereof into individual rings.

3. Apparatus of the class described, comprising a traveling mandrel adapted to grasp the end of a wire, clamping means within which said mandrel is journaled, said means having an opening for admitting the wire, and means to guide the wire on to the rotating mandrel to form a helical coil, said means being positioned on the clamping means at an oblique angle to the longitudinal axis of the mandrel.

4. Apparatus of the class described, comprising a traveling mandrel adapted to grasp the end of a wire, a pair of pivoted clamps within which said mandrel is journaled, a crank for manually rotating said mandrel, means to adjust the clamps on the mandrel to permit free rotation and longitudinal travel of said mandrel therein, said clamps being spaced one from the other in adjusted position leaving an opening for admitting the wire, and means to guide the wire on to the rotating mandrel to form a helical coil, said means being positioned at an oblique angle to the longitudinal axis of the mandrel.

5. Apparatus of the class described, comprising a traveling mandrel adapted to grasp the end of a wire, a pair of pivoted clamps adapted to enclose said mandrel, said clamps together having an axial opening within which said mandrel is journaled, one portion of said opening being enlarged and forming in conjunction with the mandrel an annular space within which said wire may lie, a crank for manually rotating said mandrel, means extending through one of said clamps and engaging the other for adjusting them on the mandrel to permit free rotation and longitudinal travel of said mandrel therein, said clamps being spaced one from the other in adjusted position leaving a longitudinal opening therebetween for admitting the wire, and means on one of said clamps to guide the wire on to the rotating mandrel at an oblique angle to the longitudinal axis of the mandrel, whereby the mandrel will travel longitudinally with respect to the clamps as it rotates therein forming a helical coil of the wire in said annular space.

6. Apparatus of the class described, comprising a traveling mandrel having an axial tapered perforation and longitudinal slots extending from the periphery to the said perforation and splitting said mandrel in two places, only one of said slots extending completely throughout the length of said mandrel, a tapered pin inserted in said perforation for expanding said mandrel, said mandrel being provided with a perforation at one end extending inwardly from the periphery adjacent said complete slot and being adapted to receive one end of a wire, a crank projecting from said mandrel opposite said complete slot for manually rotating said mandrel, a pair of clamps adapted to enclose said mandrel, said clamps together having an axial opening within which said mandrel is journaled, one portion of said opening being enlarged and forming in conjunction with the mandrel an annular space within which said wire may lie, a hinge plate extending from one edge of one clamp to the opposite edge of the other at each end thereof, means to pivot the plates to said clamps whereby the latter may be swung apart to expose said mandrel, adjustment screws extending through one of said clamps and abutting the other at the edge opposite said hinges for adjusting said clamps on the mandrel to permit free rotation and longitudinal travel of said mandrel therein, said clamps being spaced one from the other in adjusted position leaving a longitudinal opening therebetween for admitting the wire to the perforation in said mandrel, and a recessed portion on one of said clamps opening into the said space therebetween and opposite the perforation when the mandrel is in its initial position, said recess being positioned at an oblique angle to the longitudinal axis of the mandrel whereby the mandrel will travel from its said initial position longitudinally with respect to the clamps as it rotates therein forming a helical coil of the wire in said annular space.

7. Apparatus of the class described, comprising a traveling mandrel adapted to grasp a wire, a support within which one end of said mandrel is journaled, means to rotate said mandrel and form a helical coil of wire on its surface substantially enclosing said end thereof as it travels beyond said support, and means on said support spaced from said surface of the mandrel to accommodate the coil therebetween and adapted to substantially enclose the coil as it is formed until the entire free end of the mandrel and coil are thus supported.

8. Apparatus of the class described, comprising a traveling mandrel adapted to grasp a wire, a support within which one end of said mandrel is journaled, means to rotate said mandrel and form a helical coil of wire on its surface substantially enclosing said end thereof as it travels beyond said support, and a hollow projection on said support into which said mandrel travels, the walls of said projection being spaced from said surface of the mandrel to accommodate the coil therebetween, said walls being adapted to substantially enclose the coil as it is formed until the entire free end of the mandrel and coil are thus supported.

9. The method of producing split wire rings, including coiling a length of wire into a helix while supporting the inner wall thereof as the coil is formed, confining said coil about the outer wall thereof against distortion as the coil is formed, cutting through one side of the coil while maintaining it thus supported and confined, and then releasing the coil to permit removal of the individual turns of the helix as separate rings.

10. The method of producing split wire rings, including anchoring one free end of a length of wire, rotating said end in a helical path for coiling the wire into a helix, supporting the inner wall of said helix as the coil is formed, confining said coil about the outer wall thereof against distortion as the coil is formed, cutting through one side of the coil while maintaining it thus supported and confined, releasing the outer wall of the coil from confinement, and then removing the individual turns of the helix from the support as separate rings.

ALFRED STENWALL.